July 15, 1969   E. MEDAL   3,455,506
THERMOSTATIC VALVE
Filed Jan. 21, 1966
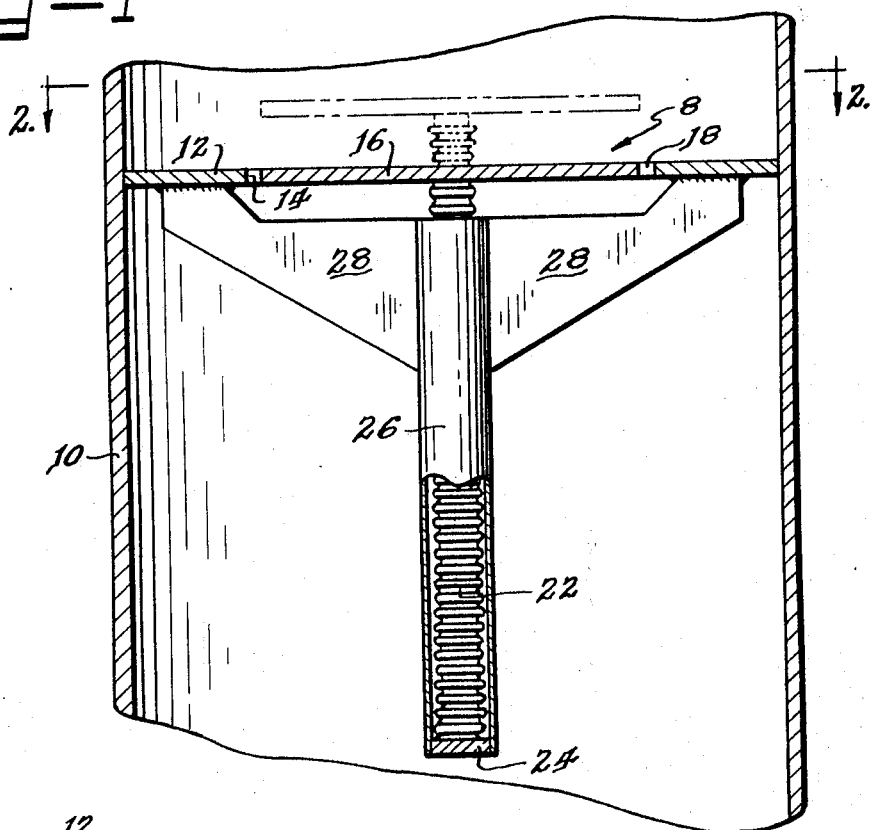
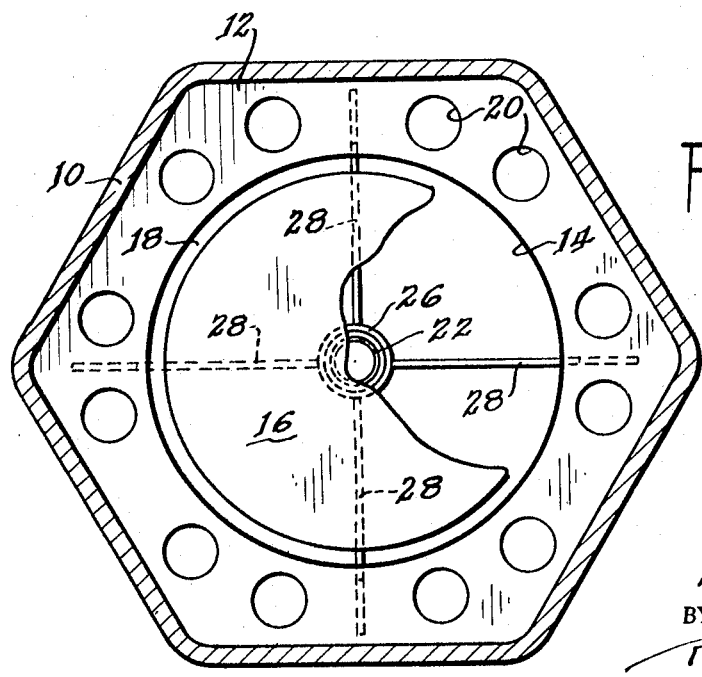
INVENTOR.
Einar Medal
BY
Roland A. Anderson
Attorney : 3,455,506
Patented July 15, 1969

1

3,455,506
THERMOSTATIC VALVE
Einar Medal, Washington, D.C., assignor to the United States of America as represented by the United States Atomic Energy Commission
Filed Jan. 21, 1966, Ser. No. 522,328
Int. Cl. G05d 23/12; F16k 17/38
U.S. Cl. 236—93                    2 Claims

ABSTRACT OF THE DISCLOSURE

An automatically adjustable valve for use in a liquid-circulating system in which a perforated disc mounted perpendicular to the coolant flow contains a central movable gate connected to a liquid-filled temperature-responsive bellows which is enclosed and supported by a tubular structure attached to the perforated disc.

The invention described herein was made in the course of, or under, a contract with the United States Atomic Energy Commission.

This invention relates to thermostatic valves used in conjunction with a liquid circulating system to control the flow therethrough, and more particularly, to a temperature-responsive valve of the bellows type.

One of the objects of the invention is to provide an automatically adjustable valve in the flow area of a coolant tube through the use of the relatively high linear expansion coefficient of a fluid such as sodium to furnish the "stroke" needed to adjust the valve. As the temperature in the tube increases, the cooling flow is increased proportionately.

Another object is to provide means for a minimum flow of coolant through the valve while the valve is in a seated or "closed" position.

This invention is of significant importance when used in the flow area of a breeder fuel element in a nuclear reactor, especially when sodium is used as the coolant moderator. Some of the advantages noted are: (1) the reliable and predictable expansion of the bellows; (2) the compatibility of the enclosed medium in the bellows and the moderator in the flow area outside of the bellows, both being sodium; and (3) permits the use of a variable sodium-flow rate with a fixed outlet temperature.

The invention will now be described with reference to the accompanying drawings in which:

FIG. 1 is a vertical sectional view showing the valve positioned within the tube; and FIG. 2 is a horizontal sectional view taken on lines 2—2 of FIG. 1, with a portion broken away.

A valve 8, located within a coolant pipe 10, has a perforated disc 12 attached to the inner wall of said pipe 10 as by weldinng. The disc 12 has a central aperture 14 within which a gate 16 is received. The diameter of the gate 16 is somewhat smaller than the aperture 14, thus providing a narrow annular space 18 between the disc 12 and gate 16 when the valve is considered to be in a normally closed position. This annular space 18, along with perforations 20 arranged generally in a circle in the disc 12, have a sufficient open area to permit a predetermined minimum amount of coolant to flow through the valve 8 while it is in the normally closed position.

A rather long narrow tubular metal bellows 22, filled with a substance, such as sodium, having a high expansion coefficient and liquid at operating temperature, has one end sealed to the under side of the gate 16, and the opposite end sealed to a bottom closure 24 for the end of a guide tube 26. The guide tube 26, surrounding the bellows 22, keeps the bellows from tilting and thus assures that the gate 16 may enter the aperture 14 in the disc 12. The guide tube 26 is held in place by four brackets 28 welded to the outside of the tube 26 and the underside of the disc 12. The brackets 28 are distributed about the guide tube 26 and extend radially outward from the coolant pipe 10. The bellows 22 and guide tube 26 are located in the coolant pipe 10 and extend longitudinally thereof and more particularly along the axis thereof.

The apparatus just described may be used for automatically adjusting the cooling flow area in a breeder section of a nuclear reactor. Reference is made to the Proceedings of the Second United Nations International Conferences on the Peaceful Uses of Atomic Energy, Geneva, 1958, vol. 9, part 2, page 323, "Construction Design of EBR–II," for a disclosure of a breeder reactor.

The coolant pipe 10 may constitute an extension of the outer tube of an assembly of breeder elements. Sodium flowing over the breeder elements for cooling flows through the pipe 10 past the valve 8. The pipe 10 and the various parts of the valve 8 may be formed of stainless steel. The bellows 22 is filled with sodium at operating temperature, sealed, and installed.

When sodium is flowing through the coolant pipe and valve 8, the sodium temperature determines the length of the bellows 22, the position of the gate 16 with respect to the disc 12, and thus the opening of the valve 8. The higher the sodium temperature, the greater the length of bellows 22, the greater the opening of valve 8, and the greater the flow of sodium through the valve. Thus, as the sodium temperature goes up, the valve opening increases to provide for greater sodium flow, resulting in a greater cooling effect to compensate for the higher sodium temperature.

From a nuclear standpoint, the sodium in the bellows 22 is compatible with the sodium in the pipe 10. The bellows 22, acting as an adjustable valve stem, has a high degree of expansion with temperature increase, and so the valve 8 is very sensitive to temperature change. The guide tube 26, by keeping the bellows 22 from tilting, enables it to behave as a stiff, yet readily expanding valve stem for the gate 16.

It is also understood that the invention is not to be limited by the details given herein but that it may be modified within the scope of the appended claims.

The embodiments of the invention in which an exclusive property or privilege is claimed are defined as follows:

1. An assembly comprising a coolant pipe, a disc secured to the inside of the pipe, said disc having an aperture therein, a guide tube extending longitudinally of and within the pipe and having an open end adjacent the plane of the disc and a closed end spaced from said plane, means supporting the guide tube on the disc, a gate capable of being received within the aperture, a long narrow tubular metal bellows positioned in the guide tube and having one end sealed to the closed end of the guide tube and the other end sealed to the gate and sodium filling the tubular bellows.

2. The assembly specified in claim 1, the gate being smaller in diameter than said aperture whereby an annular space is formed about said gate when said gate is received in said aperture and the disc having a series of perforations located in a circle about the aperture.

References Cited

UNITED STATES PATENTS

| | | | |
|---|---|---|---|
| 1,548,900 | 8/1925 | Parks | 137—468 X |
| 1,784,077 | 12/1930 | Searle | 236—34 |
| 2,200,318 | 5/1940 | Yonkers | 236—34 X |
| 3,028,464 | 4/1962 | Zearfoss | 73—368.2 X |
| 2,767,739 | 10/1956 | Hughes et al. | |
| 3,229,755 | 1/1966 | Komarow | 165—32 |

FOREIGN PATENTS

| | | |
|---|---|---|
| 825,375 | 12/1937 | France. |
| 680,910 | 9/1939 | Germany. |
| 74,260 | 11/1960 | France. |

LAVERNE D. GEIGER, Primary Examiner

E. J. EARLS, Assistant Examiner

U.S. Cl. X.R.

137—468; 138—46; 165—32; 236—99